Dec. 27, 1949     M. J. STACOM     2,492,668
METHOD OF SEPARATING THE FATS, FLAVORING INGREDIENTS
AND FIBROUS MATERIAL IN CELLULAR SUBSTANCES
Filed Oct. 29, 1946
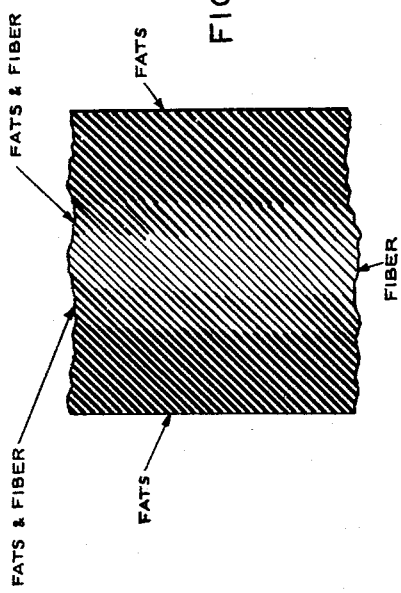
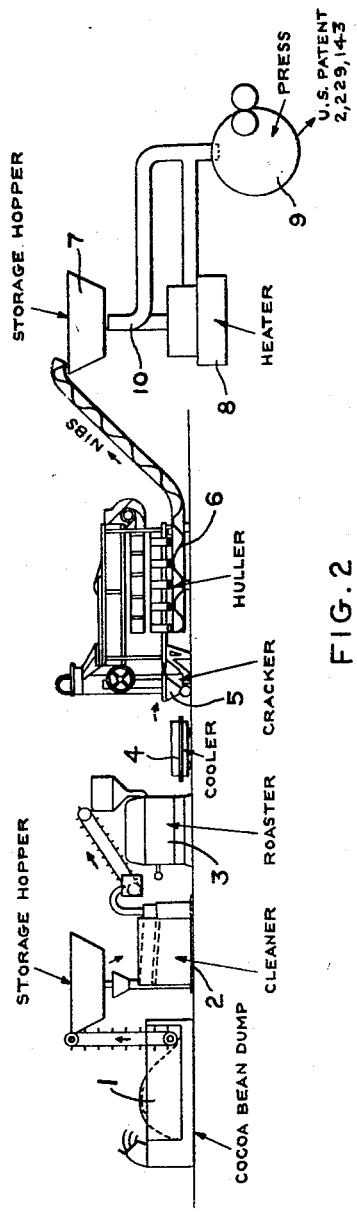
MATTHEW J. STACOM
*INVENTOR.*

Patented Dec. 27, 1949

2,492,668

UNITED STATES PATENT OFFICE 2,492,668

METHOD OF SEPARATING THE FATS, FLAVORING INGREDIENTS, AND FIBROUS MATERIAL IN CELLULAR SUBSTANCES

Matthew J. Stacom, New York, N. Y.

Substituted for abandoned application Serial No. 568,630, December 18, 1944. This application October 29, 1946, Serial No. 706,491

9 Claims. (Cl. 99—23)

This invention relates to a process or method of separating the fats, and fibrous material in various fat-containing cellular substances such as cocoa beans, vanilla beans, various types of nuts or the like, and which process may in some instances be employed for separating the proteins from the fibrous or cellulosic matter in various substances such as soy beans, animal or vegetable membranes, etc.

This application is a substitute of my application Serial Number 568,630, filed December 18, 1944, now abandoned.

More specifically, the present invention relates to a process of producing flavoring products, food products, etc., and various by-products from fatty-containing cellular substances by a novel method of applying pressure at predetermined rates in combination with predetermined temperatures to effect a separation of the fats, flavoring ingredients, and the fibrous material of such substances.

In carrying out the method of the present invention, a roller press is employed, either a ring and roller press such as described and claimed in my prior Patent No. 2,229,143, issued January 21, 1941 a roller press embodying a pair of yieldably mounted parallel rollers having sufficient diameters to apply the pressures in the desired degrees and provide the proper feed of the raw material being treated between the rolls, or any other type of press applying yielding gradually increasing pressures from the point of feed acceptance of the material to the point of maximum application of pressures.

In the drawings:

Figure 1 is a view diagrammatically illustrating the manner in which the separation of the substance takes place in the carrying out of the present invention, and Figure 2 is a view diagrammatically illustrating the manner of treating one specific substance, that is, cocoa beans to produce chocolate and cocoa by the separation of the fats and part of the flavoring ingredients from the fibrous substance of the beans.

Various substances both plant and animal tissues contain fats or oils which are rendered fluid at various temperature degrees, for example, the oil or fats of the soy bean becomes fluid at substantially 55° to 60° F. while the fats of cocoa beans after separation from the fibers of the bean become fluid at substantially 98° to 106° F. but retain their non-liquid state at higher temperatures when contained in the bean with the fiber.

The present invention comprehends the method of separation wherein the temperature of the substance being treated is maintained at a degree sufficient to render the fats and or oils flowable under pressure, but not in liquid state sufficient to permit them to flow unaided or to drip, so that when separated from the fiber or cellulose of the substance being treated, the oils or fats will be in a plastic state; that is, will be capable of being deformed continuously without rupture, and will have sufficient fluidity to permit their flow through a bed or filter of fiber when subjected to a yieldable gradually increasing pressure of predetermined degree.

Following will be given a specific application of the method of the present invention as applied in connection with the manufacture of chocolate and cocoa from cocoa beans for the purpose of more clearly bringing out the manner of performing the method, but it is to be understood that such specific disclosure is by way of an example, and that the invention is not limited to the specific details set out, but temperatures, pressures and other specific details may be varied as required to apply the method to various substances to provide the desired result and products, all within the scope of the present invention as defined in the claims hereof.

A general layout, in diagram, of a plant for treating cocoa beans in accordance with the present invention is shown in Figure 2 of the drawings, wherein the green cocoa beans are taken from the dump 1 and passed through a cleaner 2, and from the cleaner to a roaster 3 where the beans are roasted.

From the roaster, the roasted beans are usually passed through a cooler indicated 4, and from the cooler to a cracker 5 where the beans are cracked and converted into what is commercially known as "nibs." The nibs or cracked beans are passed from the cracker through a huller 6 and thence to a storage hopper 7. All of the equipment so far described in connection with Figure 2 is standard equipment employed in present day chocolate and cocoa processing plants, and the steps outlined are employed in present day approved methods or processes.

In one manner of carrying out the method of the present invention, the chocolate bean nibs are passed from the storage hopper 7 to a heater 8 of any approved construction which may be purchased upon the open market, and the heated nibs are passed to the roller press 9. If it is desired, the roller or the ring and rollers of the press 9 may be heated, or the atmospheric temperature surrounding the press may be sufficient to heat the press to the desired temperature at which time the nibs will be passed directly to the press, bypassing the heater 8. A valve is indicated at 10 to permit bypassing of the heater 8 by the nibs on their passage to the press.

The press 9 may be the ring and roller type of press (with the use of which the best results have been obtained) as disclosed in my prior Patent No. 2,229,143 issued January 21, 1941, or any other suitable type of press which will apply yielding gradually increasing pressure from the point of feed acceptance of the nibs into the press to the point of maximum application of pressure, and which will apply the pressure in sufficient degree to carry out the method of the present invention.

In carrying out the present method, when the nibs are heated prior to their feeding into the press, they are heated to a temperature ranging from 130° F. to a temperature slightly below the temperature at which the contained fats become liquefied. In actual carrying out of the process, the best results have been obtained when the nibs are heated to a degree of approximately 130° F. although advantageous results have been obtained at higher temperatures.

The heated nibs are fed into the press and pass through the pressure zone thereof where a gradually increasing pressure from their point of feed acceptance to the point of maximum pressure application is applied to the nibs. In employing the ring and roller press disclosed in my prior patent above referred to, gauge pressures ranging from one thousand pounds to two thousand pounds were employed which resulted in pressures of from approximately seven thousand pounds per square inch to approximately fourteen thousand pounds per square inch being applied to the nibs at the point of maximum pressure application in the press.

The temperature to which the nibs are heated is such that the fats are rendered plastic, that is, will have sufficient fluidity to permit an accumulation of the fats to be deformed under pressure without rupture, and not be sufficiently fluid to drip or lose their accumulated body condition when the pressure is applied to the nibs. The application of the pressure in the manner abovestated to the nibs so heated results in a separation of the fats and fiber of the nibs in the manner indicated in Figure 1 of the drawings, that is, the fiber or cellulose clings to the center of the operative face of the ring and roll, or the rolls when a straight roller press is employed, and the released plastic fats being forced to move by the applied pressure, filters latterly through the fiber mass or blanket and accumulates at the outer edges of the blanket of material. At some points between the comparatively fat-free fiber in the longitudinal center of the blanket and the relatively fiber-free fats at the longitudinal edges of the blanket of substance there are zones of material, the composition of which are more nearly equal proportions of fats and fibers. It has been found in carrying out the present process that the greater proportion of the flavoring ingredient is carried along with the fats to the outer edges of the blanket, thus providing a chocolate or what is known in the art as chocolate liquor, which contains a high flavor and a relatively small proportion of fiber, which may or may not require further treatment to provide a commercial bitter chocolate, depending on the use to which the bitter chocolate is to be put.

By regulating the line at which suitable cutters or separators of any approved type for removing the blanket from the ring and roll or rolls are arranged relative to the width of the face of the ring and rolls or rolls to which the blanket clings, the proportion of fats contained in the fiber or cocoa part of the blanket may be regulated, and likewise the proportion of fiber contained in the fats or chocolate part of the blanket may be regulated, all within approximate proportions sufficient to most commercial conditions and requirements of use, or, if desired, the fats and fiber may be mixed either with or without sugar or other substances and again run through the press or otherwise treated to provide an end product of the combined fats, fiber, and flavoring.

In instances where the ring and roll, or the rolls of the press are heated, it has been found that if these members are at a temperature of from 70° F. to 95° F. the same results are obtained as when the nibs are heated as above described, with the best results obtained insofar as cocoa nibs are concerned when the ring and roll or the rolls in a parallel roll press are at a temperature of between 85° F. and 90° F.

In treating some substances in accordance with this method, it is desirable that the pressure per square inch applied to the substance as it passes through the press be regulated in proportion to the temperature of the material as it is fed to the press.

While in the foregoing example referring to the treatment of cocoa beans both temperature and pressure limits are specified, it is to be understood that various temperatures and various pressures, or various relative proportionate regulation of temperature and pressures may be employed in carrying out the method of the present invention, depending upon the substance being treated for separation of fats, flavoring and fibers therefrom.

The terms plant substances and plant seeds are employed in the present application in the broad sense and are to be construed as including various types of beans, seeds and nuts, such as cocoanuts, peanuts, walnuts, almonds, filberts, cotton seeds, and such other fat containing plant substances as fall within the general terminology of the terms.

What is claimed is:

1. The method of separating the fats and fiber in fat-containing cellular substances which comprises heating the substance to a temperature at which the fats become plastic but not liquid and applying pressure of a predetermined degree to a blanket of the heated material in gradually increasing degree from the point of initial application to the point of maximum application of pressure to the substance, the degree of said pressure being regulated so that the fiber will remain at the longitudinal central portion of the blanket of material being treated while the plastic fats will accumulate at the longitudinal side edges of the blanket.

2. The method of separating the fats and fiber in fat-containing cellular substances which comprises heating the substance to a temperature at which the fats become plastic but not liquid and applying pressure of a predetermined degree to a blanket of the heated material in gradually increasing degree from the point of initial application to the point of maximum application of pressure to the substance, said predetermined pressure degree being regulated so that the fiber will remain at the longitudinal central portion of the blanket of material being treated while the plastic fats will accumulate at the longitudinal side edges of the blanket, and regulating the approximate fiber content of the separated fat and fat content of the separated out fiber by controlling the relative widths of the side edge strips and the central strip when removed from the blanket.

3. The method of separating the fats, flavoring ingredients and fiber in fat-containing cellular substances which comprises applying pressure of a predetermined degree to a blanket of the substance while at the same time the substance is maintained at a temperature sufficient to render the fats plastic but not liquid whereby the fiber will remain at the longitudinal central portion of the blanket of material while the plastic fats and the greater per cent of the flavoring ingredients will accumulate at the longitudinal side edges of the blanket and regulating the approximate fiber content of the separated fat and the fat content of the separated out fiber by controlling the relative widths of the side edge strips and the central strip of the blanket when removed from the blanket.

4. The method of separating the fats and fiber in fat-containing plant substances which comprises heating the substance to a temperature at which the fats become plastic but not liquid and applying pressure of a predetermined degree to the heated material in gradually increasing degree from the point of initial application to the point of maximum application of pressure to the substance said predetermined pressure degree being regulated so that in the blanket formed of material while it is subjected to the pressure the fiber will remain at the longitudinal central portion of the blanket of material while the plastic fats will accumulate at the longitudinal side edges of the blanket and regulating the approximate fiber content of the separated fat and the fat content of the separated out fiber by controlling the relative widths of the side edge strips and the central strip when removed from the blanket.

5. The method of producing a chocolate and cocoa from cocoa beans which includes roasting the cocoa beans, heating the beans to a temperature of approximately 130° F., and applying pressure of a predetermined degree to the heated cocoa beans in gradually increasing degree from the point of initial application to the point of maximum application of pressure to the beans.

6. The method of producing chocolate and cocoa from cocoa beans which includes roasting the cocoa beans, heating the beans to a temperature at which the fats become plastic but not liquid, and applying pressure of a predetermined degree to the heated cocoa beans in gradually increasing degree from the point of initial application to the point of maximum application of pressure to the beans said predetermined pressure degree being regulated so that in the blanket of material formed by the beans to which the pressure is applied the fiber will remain at the longitudinal central portion of the blanket of material while the plastic fats together with the greater percentage of the flavoring ingredients will accumulate at the longitudinal side edges of the blanket, and regulating the approximate fiber content of the separated fat and the fat content of the separated out fiber by controlling the relative widths of the side edge strips and the central strip when removed from the blanket.

7. The method of separating the fats and fiber in fat containing cellular substances which comprises heating the substance to a temperature of approximately 130° F., applying pressure of a predetermined degree from rolling pressure applying surfaces to a blanket of the heated material in gradually increasing degree from the point of initial application to the point of maximum application of pressure to the substance, regulating said predetermined pressure degree so that the fiber will remain at the longitudinal central portion of the blanket of material being treated while the plastic fats will accumulate at the longitudinal side edges of the blanket.

8. The method of separating the fats and fiber in fat containing cellular substances which comprises applying a pressure of a predetermined degree from rolling pressure applying surfaces heated to a temperature between 70° F. and 90° F. to a blanket of material in gradually increasing degree from a point of initial application to a point of maximum application of pressure to the substance.

9. The method of separating the fats and fiber in fat containing cellular substances which comprises applying a pressure of a predetermined degree from rolling pressure applying surfaces heated to a temperature between 70° F. and 90° F. to a blanket of material in gradually increasing degree from a point of initial application to a point of maximum application of pressure to the substance, and regulating said predetermined pressure degree so that the fiber will remain at the longitudinal central portion of the blanket of material being treated while the plastic fats will accumulate at the longitudinal side edges of the blanket.

MATTHEW J. STACOM.

REFERENCES CITED

The following references are of record in the file of this patent:

UNITED STATES PATENTS

| Number | Name | Date |
| --- | --- | --- |
| 2,229,143 | Stacom | Jan. 21, 1941 |
| 2,336,346 | Carver | Dec. 7, 1943 |